United States Patent [19]

Simons

[11] 4,186,902

[45] Feb. 5, 1980

[54] SNAP-LOCK TERMINATOR MOUNTING BRACKET ASSEMBLY

[75] Inventor: Craig W. Simons, Hackettstown, N.J.

[73] Assignee: Amerace Corporation, New York, N.Y.

[21] Appl. No.: 924,821

[22] Filed: Jul. 14, 1978

[51] Int. Cl.$^2$ .......................... F16L 3/08; H01B 17/16

[52] U.S. Cl. .................................... 248/73; 248/74 A; 248/221.4; 174/163 R

[58] Field of Search ........... 174/163 R; 248/73, 74 R, 248/74 A, 74 B, 221.4, 74 PB

[56] References Cited

U.S. PATENT DOCUMENTS

| | | | |
|---|---|---|---|
| 1,787,734 | 1/1931 | Rowling | 248/74 B |
| 2,927,809 | 3/1960 | Shielko | 174/163 R |
| 3,278,146 | 10/1966 | Simon | 248/221.4 X |
| 3,794,751 | 1/1974 | Farmer et al. | 248/74 R |
| 3,921,949 | 11/1975 | Coon | 174/163 R X |

*Primary Examiner*—James C. Mitchell
*Attorney, Agent, or Firm*—S. Michael Bender; Ken Richardson

[57] ABSTRACT

An interconnecting terminator bracket member and a resilient ring-shaped sleeve member are provided with a fastening means for releasably snap-locking the sleeve onto an electrical terminator for electrical cables without a need for nuts, bolts, screws, washers, and other conventional-type fastener hardware at the sleeve. The fastener means comprises two resiliently loaded spaced elements which project from an opening in the sleeve and a detent means which is formed within the bracket. The opening enables the two spaced elements to be squeezed or compressed towards one another. The detent means is uniquely configured to maintain the elements in a compressed state at the start of insertion, momentarily release the two compressed elements from compression forces exerted thereon during insertion, and completely enclose the elements when in the compressed state once insertion is complete. The fastener means is operated by inserting the elements when in the compressed state within confines of the detent means. During insertion, the elements are momentarily freed from the compression forces exerted thereon and are enabled to spring into abutting engagement within the enclosing confines of the detent means to effect their capture as well as to effect releasable snap-locking of the sleeve about the terminator when the latter is seated therein.

11 Claims, 6 Drawing Figures

SNAP-LOCK TERMINATOR MOUNTING BRACKET ASSEMBLY

The present invention relates generally to a terminator mounting bracket assembly and more particularly, to a snap-lock fastening means provided by the assembly which permits an electrical terminator to be releasably secured by the sleeve for the support thereof without the use of nuts, bolts, screws, washers and other conventional-type fasteners at the sleeve.

A common need associated with prior art terminator mounting brackets, of the type which are used to support electrical terminators for electrical cables at riser poles, is to design the brackets to have a simple construction, consisting of few parts, with suitable structural strength to support the terminators under varying environmental conditions without failure. Additionally, prior art terminator brackets must also be designed such that the terminators may be releasably secured thereto, as well as being fairly easy to assemble as units and easy to connect and disconnect between the riser poles and the terminators at job sites. These needs are dictated in part by manufacturing and tooling costs, inconvenience, and obvious hazards, such as: mechanical breakdowns in the insulation of conductive cables encased by the terminators; dangerous voltages arcing to unwanted grounds from cables with insulation that have broken down; short circuits; and electrocution, which can occur if the brackets should fail.

To meet these needs, prior art terminator mounting brackets are usually constructed in assemblies that include a terminator gripping or support member, one or more terminator bracket members, and conventional-type fastener hardware such as nuts, bolts, screws, and washers. The terminator brackets usually consist of one or more elongated flat metal bars formed with special configurations so as to enable the brackets to be connected between the riser poles and the terminators, as well as being formed with a number of threaded and/or non-threaded apertures therein. Bracket segments containing the apertures are enabled thereby to fastened either directly to the riser poles or to be fastened to conventional cross-mounting brackets which are in turn attached to the riser poles. Similarly, the apertured segments also enable the brackets to be fastened to the terminator support members. Other terminator brackets, however, include segments thereof that are integrally formed with the support members so as to be unitary therewith.

Many support members normally consist of circular-shaped metal collars or band-like clamps that are adaptable to be fastened around the terminators they support. Yet other support members are simply flat disc-like plates, that are designed to permit mounting ends of the terminators to be seated or juxtaposed thereon. Fastener hardware is utilized to releasably secure the terminators to the different types of support members, as well as to the terminator brackets except when the brackets and the support members are integrally constructed as unitary members as mentioned hereinabove.

Prior art terminator mounting brackets, however, have suffered from one or more shortcomings. For example, some have been unduly complex, comprise an undesirable number of parts, are difficult to install or disconnect between the riser poles and the terminators, or are quite costly to manufacture. Yet others are structurally weakened, by virtue of the particular configurations required to satisfy the functions of releasably securing the terminators and adequately supporting the terminators between the support members and the riser poles or cross-bracket members.

Accordingly, it is therefore a general object of the present invention to provide a snap-lock terminator mounting bracket assembly overcoming the many shortcomings of the prior art assemblies.

It is another general object to provide a low-cost simplified snap-lock terminator mounting bracket assembly which in certain embodiments comprises only two relatively inexpensive components.

It is a further general object to provide a snap-lock terminator mounting bracket assembly which can be easily, quickly, and conveniently installed and/or disconnected at the cross-bracket member and at the terminator.

It is a more specific object to provide a snap-lock terminator mounting bracket assembly having a fastener means which releasably secures the terminator at the assembly without a need for nuts, bolts, screws, washers or other conventional-type fastener hardware at the terminal support member.

It is another more specific object of this invention to provide a snap-lock terminator mounting bracket assembly having a fastener means which comprises a pair of spring-loaded, compressible elements carried by a sleeve member of the assembly such that the fastener means cooperates with a detent element at a bracket member of the assembly in a manner to releasably snap-lock the sleeve at the terminator without a need for nuts, bolts, screws, washers or other conventional-type fastener hardware at the sleeve.

It is still another more specific object of this invention to provide a snap-lock terminator mounting bracket assembly having a sleeve member thereof which includes a plurality of anti-movement elongated raised ridge-shaped surface irregularities thereon for preventing movement of an electrical terminator for electrical cables releasably secured and supported at the sleeve under load conditions, as well as permitting the sleeve to automatically adjust a required frictional gripping-force exerted by the sleeve upon the terminator for the support thereof when the terminator is utilized with cables having different sizes and/or variations in their diameters resulting from manufacturing imperfections.

It is yet a further more specific object of this invention to provide a snap-lock terminal mounting bracket assembly comprising a sleeve member thereof with a plurality of reinforcing raised spherical-shaped surface irregularities thereon for preventing the sleeve member from losing its geometrical configuration or becoming otherwise distorted when under load conditions associated with releasably securing and supporting an electrical terminator for electrical cables at the sleeve.

It is yet and still an additional more specific object of this invention to provide a snap-lock terminator mounting bracket assembly comprising a terminator bracket member thereof having a pair of spaced reinforcing elongated rib-shaped surface irregularities thereon for preventing the bracket from losing its geometrical configuration or becoming otherwise distorted when under load conditions associated with releasably securing and supporting an electrical terminator for electrical cables between a sleeve member of the assembly and a cross-bracket member attached to a riser pole.

The above objects, as well as still further objects and advantages, are attained by the invention which may be described as a terminator mounting bracket assembly of the type for releasably securing and supporting an electrical terminator for electrical cables, said assembly comprising: a tubular-shaped sleeve member including a wall with opposed edges and an opening extending between said opposed edges, said opening defining two confronting spaced end portions of said wall, said wall comprising resilient material so as to permit said two confronting spaced ends to be movable from a first position where said two ends are normally spaced from each other to a second position where said two ends are spaced closer to one another and are resiliently urged to return to said first position; a bracket member having a detent means formed therein; and a fastener means defined by said two confronting ends and said detent means, said detent means being adaptable to receive and enclose said two ends when inserted therein only upon said two ends being displaced into said second position, said detent means being adapted to permit said two ends to spring apart in an attempt to return to said first position from said second position and being further adapted to arrest said two ends in a third position when said two ends are said displaced relative to each other with respect to said first position thereby to effect a snap-locking of said sleeve within said detent means.

The invention will be more fully understood, while still further objects and advantages will become apparent in the following detailed description of a preferred embodiment of the invention illustrated in the accompanying drawing, in which.

Figure 1:
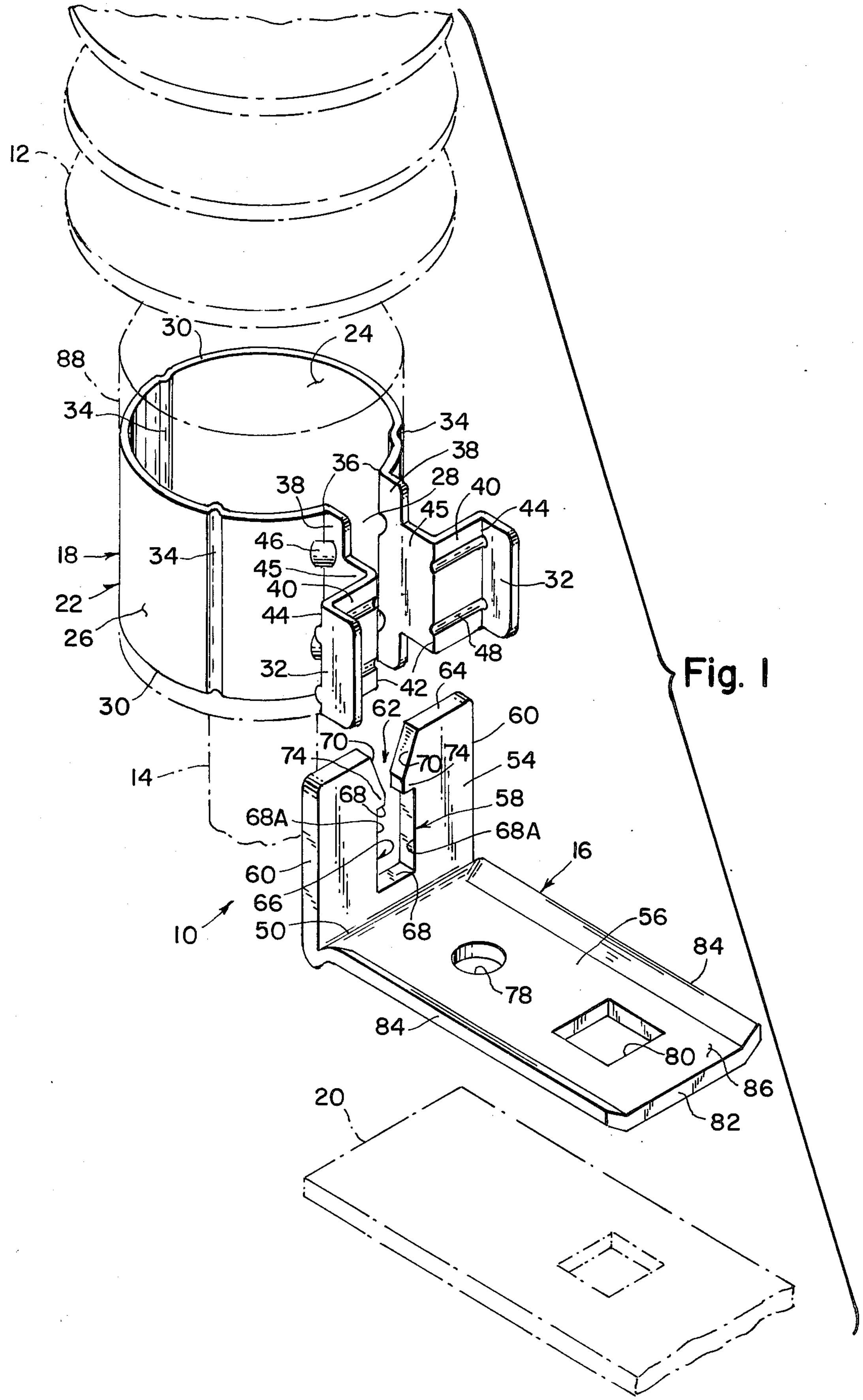
FIG. 1 is an exploded, perspective view illustrating the components of the mounting bracket assembly constructed in accordance with the invention.

Referring now to the drawing and initially to FIGS. 1 through 4 thereof, there is illustrated a preferred embodiment of a snap-lock terminator mounting bracket assembly 10, adapted for mounting and supporting an elongated generally tubular-shaped terminator element 12 for a high voltage electrical cable 14, which assembly 10 is constructed in accordance with the invention. Assembly 10 is seen to include a terminator bracket member 16 and a resilient terminator support member or sleeve 18, as well as desired ones of conventional-type fasteners not here illustrated. The fasteners are utilized to connect bracket 16 to ground and/or to a conventional-type horizontal mounting surface bracket member 20 in a manner more fully described hereinafter. The details of construction of terminator element 12 are conventional and form no part of the present invention, hence, no purpose will be served by describing same herein. Instead, the interested reader is directed to U.S. Pat. No. 3,377,420 which fully describes such a terminator element.

Sleeve 18 is preferably constructed from a flat, sheet-like material through conventional blanking, stamping, and bending forming operations. This material must ideally provide sleeve 18 with suitable resilient properties and elastic properties for satisfactorily securing and supporting terminator 12 at bracket 20 as will be more fully described below. It also must be corrosive resistant, non-magnetic, and capable of carrying surface leakage currents originating at terminator 12 as is well known in the terminator mounting bracket art. To this accomplishment, non-magnetic stainless steel is the base material from which sleeve 18 preferably is constructed.

Sleeve 18 comprises a wall 22 of substantially uniform thickness that has been bent to provide it with a generally cylindrical or tubular configuration having an internal surface 24, an external surface 26, a slit-like shaped opening 28 which runs an entire distance between opposed edges 30 of wall 22 and two movable resiliently-loaded confronting spaced end portions 32. Internal surface 24 of sleeve 18 is provided with three spaced, elongated, relatively narrow, radially protruding ribs 34. Ribs 34 are approximately equally spaced about the circumference of internal surface 24 and are vertically positioned between opposed edges 30 as is portrayed in FIGS. 1, 3 and 4. Ribs 34 are struck from external surface 26 and form elongated, arcuate or concave shapes at internal surface 24 from which they protrude. Confronting ends 32 are defined at opening 28 and are bent along junctions or fold lines 36 relative to a remaining tubular-shaped portion of wall 22 so as to enable ends 32 to project outwardly therefrom in a spaced parallel manner as can be best seen in FIGS. 1, 2 and 3.

To this accomplishment, each end 32 is provided with a first rectangular-shaped segment 38 which extends between opposed edges 30 at a different one of the two fold lines 36. Each first segment 38 also projects outwardly from its fold line 36 before merging into a second rectangular-shaped segment 40. Each second segment 40 is positioned between the opposed edges 30 associated with first segment 38 and projects from a different one of the first segments 38 to form a substantially "L"-shaped configuration. This configuration was obtained by bending second segment 40 about junctions or fold lines 42 and 44. It is to be noted that the foregoing structure of ends 32 when considered as a whole provides each first segment 38 with internal surface portions 24 which completely face one another and each second segment 40 with internal surface portions 24, extending from an intersection 45 between the first segment 38 and the second segment 40 to fold line 42, that also face one another. Further, each second segment includes internal surface portions 24, extending between fold lines 42 and 44, which face in the same direction in addition to internal surface portions 24 extending beyond fold line 44 which face one another.

Figure 2:
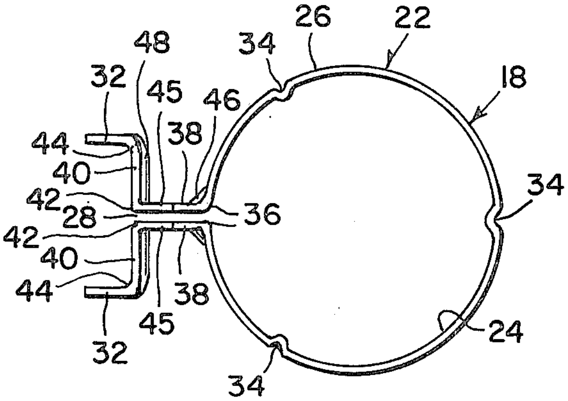
FIG. 2 is a top view of the resilient sleeve member component of the assembly of FIG. 1.
Figure 3:
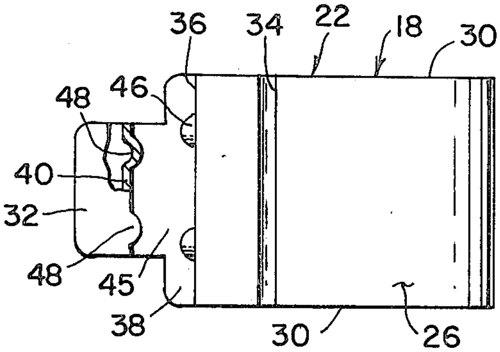
FIG. 3 is a side view of the resilient sleeve member of FIG. 2.
Figure 4:
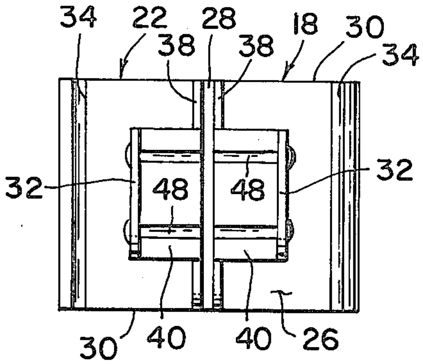
FIG. 4 is an end view of the resilient sleeve member of FIG. 3.

Additionally, each first segment 38 is provided with a pair of spaced raised global-shaped reinforcement surface irregularities or beads 46. Each pair of beads 46 is approximately centered on a different one of the fold lines 36 as is shown in FIGS. 1, 2, and 3. Beads 46 are outwardly struck from internal surface 24 and preferably have a shape approximate to that of a sphere. Similarly, each second segment 40 is provided with a pair of spaced elongated narrow raised reinforcing surface irregularities or ribs 48. Each pair of ribs 48 is positioned on a different one of the internal surface portions 24 and extends between fold lines 42 and 44 as is substantially shown in FIGS. 1, 2 and 4. Ribs 48 are preferably struck from internal surface 24 and comprise an elongated concave or arcuate shape at external surface 26 of sleeve 18.

It will be appreciated in view of the foregoing structure of sleeve 18 that the two confronting end portions 32 are resiliently loaded and are enabled to oscillate or move backwards and forwards, that is away from and toward one another, by virtue of the elastic nature of the stainless steel material comprising sleeve 18 and by virtue of the opening 28 forming a clearance space or gap between the end portions 32. To illustrate, a compression, squeezing, or contracting force when applied to the external surface portions 26 associated with each end 32, preferably at those external surface portions 26 which extend beyond fold lines 44 thereof, causes each end 32 to be moved or displaced from a first or normal position where there exists the aforementioned clearance space between the two spaced ends 32 to a compressed state where there is very little space between the two ends 32, relative to the first or normal position. In the compressed state, ends 32 are also movable from a second position position to a third position relative to the first position in a manner to effect snap-locking sleeve 18 as will be more fully explained hereinbelow.

When the compression force is removed from ends 32, sleeve 18 attempts to resiliently recover its original non-distorted shape, defined by the first position, by each end 32 rapidly separating or moving in diametrically opposite directions. Moreover, it should also be apparent that ends 32, when displaced to the compression state and the space or opening 28 therebetween is decreased, the inner diameter of sleeve 18 is contracted by virtue of the elastic compression of the stainless steel material. This enables internal surface portion 24, associated with the cylindrical or tubular shaped region of sleeve 18 including ribs 34 thereof to exert a frictional gripping force onto the confronting outer surface of terminator 12 when the latter is seated therein as will be more fully described below. Finally, those skilled in the art will recognize that beads 46 and ribs 48 reinforce sleeve 18 at fold lines 36, 42, and 44 so as to prevent sleeve 18 from becoming permanently distorted or otherwise losing its shape, particularly at ends 32 thereof, when under load condition associated with supporting and securing terminator 12.

Figure 5:
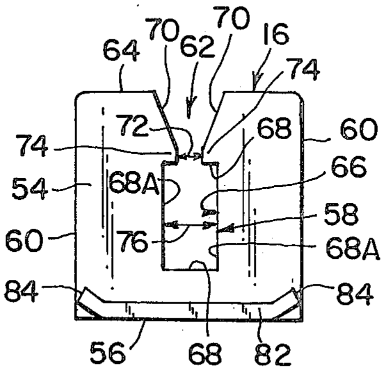
FIG. 5 is an end view of the terminator bracket member component of the assembly of FIG. 1.
Figure 6:
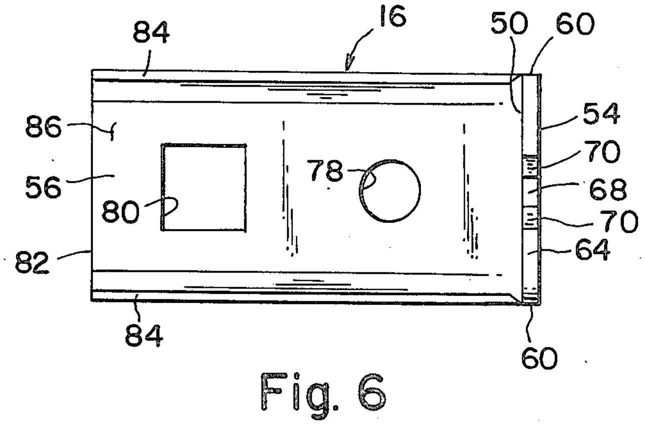
FIG. 6 is a top view of the terminator bracket member of FIG. 5.

Referring now to FIGS. 1 and 5–6, terminator bracket member 16 preferably is constructed from an elongated flat rectangular-shaped material of suitable strength properties to permit sleeve 18 to support terminator 12 at bracket 20, as well as to cooperate with ends 32 of sleeve 18 so as to form a fastening means for releasably snap-locking terminator support sleeve 18 therein as will become more apparent below. To this accomplishment galvanized iron preferably is the base material from which bracket 16 is constructed.

During forming, bracket 16 is bent along a fold line 50, such that a first segment 54 thereof is positioned at approximately a right angle relative to a remaining second segment 56 of bracket 16. First bracket segment 54 is provided with a detent means 58 which is approximately centered between opposed side edges 60 defined by bracket 16. Detent means 58 is provided with a partly beveled, partly parallel extending passage 62, which starts at an end 64 of first bracket segment 54 and runs or opens into a narrow elongated rectangular-shaped through-slot 66 having four internal surfaces or side walls, two of which are designated as 68 and two of which are designated as 68A. Slot 66 is also approximately centered between opposed side edges 60 as well as being centered between bracket end 64 and fold line 50. Slot 66, as defined by the confines of sides 68 and 68A is of a size to completely encase or surround ends 32 of sleeve 18 when seated therein in a manner more fully described hereinbelow. Passage 62 is provided with two confronting surfaces or sides 70 which converge towards one another from bracket end 64 without actually meeting and then extend in a spaced parallel manner toward slot 66 until opening therein as can be more clearly seen in FIGS. 1 and 5.

Notably, a distance 72 between each one of the two parallel extending surface portions 70 of passages 62, in a region defined by a junction or intersection 74 between passage 62 and slot 66, is comparatively substantially less than a distance 76 between each one of the two confronting parallel side wall surfaces 68A of slot 62, which side surfaces 68A extend in the same direction as the two surfaces 70 of passage 62. This structure is most clearly depicted in FIGS. 1 and 5. The distance 72 at intersection 74 is of a suitable size to maintain confronting ends 32 of sleeve 18 in a compressed or squeezed-together state as ends 32 are being pushed between and beyond confronting surfaces 70 for receipt thereof in slot 66. Distance 72 also defines the aforementioned second position by establishing the clearance between the squeezed-together ends 32 as they are urged through passage 62. Similarly, distance 76 at slot 66 is of a suitable size to maintain ends 32 of sleeve 18 in a squeezed-together state when received therein from intersection 74, and likewise, defines the aforementioned third position by establishing the clearance between squeezed-together ends 32 upon their receipt within slot 66. To this achievement, each end 32, when inserted sequentially into passage 62 and slot 66, abuttingly engages a different one of the two surfaces 70 of passage 62 and a different one of the two side surfaces 68A of slot 66. However, as is apparent particularly from FIGS. 1 and 5, the larger distance 76 between sides 68A of slot 66, upon receipt of ends 32 therein causes momentary release of the compression forces exerted on the inserted squeezed-together ends 32 by the abutting surfaces 70 of the narrower formed passage 62, thus permitting the squeezed-together ends 32 to spring apart in an attempt to recover their nondistorted positions between the wider spaced sides 68A of slot 66. The attempt by released ends 32 to expand to the first position from the second position established by surfaces 70 is prevented, however, as each end 32 abuttingly engages a corresponding one of the sides 68A. This engagement abruptly stops the outwardly expanding movement of released ends 32 in the third position, thus, facilitating complete enclosure and capture of the arrested ends 32 within the confines of slot 66.

The second bracket segment 56 is provided with a pair of spaced bolt-receiving through apertures 78 and 80 that are approximately centered between opposed bracket edges 60 and fold line 50 and a remaining end 82 of bracket 16. Each aperture 78 and 80 is shaped to receive desired ones of conventional bolt and/or screw type fasteners. A stove bolt, nut, and washer assembly preferably is utilized at aperture 78 and hexagon head bolt, nut, and washer assembly preferably is utilized at aperture 80, both of which have been omitted from the drawing for the sake of clarity since they are well known in the fastener art. To accommodate the preferred said fasteners, aperture 78 is preferably formed with a circular shape, while aperture 80 is preferably formed with a rectangular shape. As is apparent to those skilled in the art of terminator mounting brackets, aperture 80 is utilized to ground assembly 10 to horizontal mounting surface bracket member 20 in the event of a short circuit occurring at terminator 12 and sleeve 18 and to connect terminator bracket 18 to bracket 20, respectively, via the fastener hardware. In the event bracket 20 is either constructed from nonmetallic materials or is not a standard item with provision for providing a ground connection, aperture 78 may be utilized to ground assembly 10. To reinforce and strengthen bracket 16, particularly second segment 56 thereof, against bending from its original shape or otherwise becoming distorted when bracket 16 is under load conditions associated with being connected between terminator 12 and cross-bracket 20, each extremity edge portion 84 thereof is slightly bent or folded upwards from a surface 86 of bracket 16 as is clearly illustrated in FIGS. 1 and 5 and 6.

In mounting terminator 12 to a riser pole not here shown, via bracket 20, sleeve 18 is placed about a circumferentially-shaped surface 88 of terminator 12 by simply slipping sleeve 18 thereover. Each end 32 of sleeve 18 may be resiliently separated from the other at opening 28 to facilitate seating terminator 12 within sleeve 18. Once terminator 12 is seated within sleeve 18, the fastener means, that is ends 32 and detent means 58, is operated to releasably snap-lock terminator 12 within sleeve 18 by initially squeezing ends 32 towards one another by hand or with a light or small tool such as conventional pliers, since the beveled portion of passage 62 will only receive ends 32 therein upon ends 32 being sufficiently squeezed together to permit their entry between surface portions 70 thereof. As squeezed-together ends 32 are urged beyond the beveled portion of passage 62 and into the parallel extending portion at intersection 74 thereof, each end 32 engagingly abuts with a different side surface 70 thereof by virtue of squeezed-together ends 32 attempting to return to the original positions they were in before being squeezed together. The distance 72 between side portions 70 of passage 62, however, prevents this and maintains ends 32 in a squeezed-together state until receipt thereof into the wider slot 66.

It will be appreciated in view of the foregoing that the partly beveled, partly parallel extending passage 62 provides a mechanical advantage during the act of insertion by substantially reducing the magnitude of the compression forces required to maintain ends 32 in a squeezed condition and the pushing forces required to urge ends 32 beyond passage 62 into slot 66, which would normally be required if passage 62 was formed with a different configuration. It will also be appreciated that the parallel extending side surface portions 70 of passage 62 permit the inserted ends 32 to be prepared for their rapid release when conveyed within slot 66, as a consequence of the narrower distance 72 therebetween, relative to the wider distance 76 between side surfaces 68A of slot 66, maintaining squeezed ends 32 in a greater state of compression than required for the insertion thereof into slot 66.

Upon release, the rapidly resiliently expanding or separating ends 32 are arrested and captured when each released end 32 abuttingly engages a different corresponding one of the side surfaces 68A of slot 66 and becomes enclosed within the confines of the four sides 68A and 68 of slot 66. Each captured end 32 is enclosed by sides 68A and 68 at a region thereof approximately located between each fold line 36 and the intersection 45. The sleeve end portions 32 are thus snap-locked into engagement with bracket member 16. When this occurs, ends 32 are still in a squeezed-together state with the gap therebetween substantially decreased. This causes a circumferential pressure to be exerted on surface 88 of terminator 12 by the band or sleeve 18. The circumferential pressure is of a sufficient magnitude to prevent axial, circumferential, or radial movement of captured terminator 12 under load conditions typically encountered in terminator mounting bracket applications.

It will be noted that the ribs 34 under the influence of the circumferential pressure, frictionally grip or imbed themselves into surface 88 of terminator 12 to enhance the ability of the tightened sleeve to avoid any movement of locked terminator 18. In addition, ribs 34 enable sleeve 18 to satisfactorily frictionally grip terminator 12 when electrical cables therein are of different sizes or have variations in their diameters due to manufacturing imperfections. Further, raised beads 46 and raised ribs 48 between fold lines 42 and 44 also aid in this achievement by strengthening and reinforcing confronting ends 32 so as to prevent them as well as the circular-shaped portion of sleeve 18 from changing shape or becoming otherwise distorted, when subjected to forces resulting from the superposed weight of terminator 12 therein and from environmental conditions such as wind pressure.

To unlock terminator 12 from assembly 10 at cross-bracket 20, it it only necessary to reverse the afore-explained assembly procedure. Thus, captured or locked ends 32 are manually pressed or squeezed towards each other such that captured ends 32 are permitted to disengage with sides 68A of slot 66 and be conveyed through passage 62 without being impeded by confronting side surface portions 70 thereof. Sleeve 12 is then simply removed from circumferential surface 88 of terminator 12.

Although the foregoing preferred embodiment of the invention has been disclosed in detail to fullfill the requirements of statute, it is anticipated that many variations and modifications may be made without departing from the spirit and scope of the invention as defined only by the appended claims.

I claim:

1. A terminator mounting bracket assembly of the type for releasably securing and supporting an electrical terminator for electrical cables, said assembly comprising:

(a) a tubular-shaped sleeve member including a wall with opposed edges and an opening extending between said opposed edges, said opening defining two confronting spaced end portions of said wall, said wall comprising resilient material so as to permit said two confronting spaced ends to be movable from a first position where said two ends are normally spaced from each other to a second position where said two ends are spaced closer to one another and are resiliently urged to return to said first position;

(b) a bracket member having a detent means therein; and (c) a fastener means defined by said two confronting ends and said detent means, said detent means being adaptable to receive and enclose said two ends when inserted therein only upon said two ends being displaced into said second position, said detent means being adapted to permit said two ends to spring apart in an attempt to return to said first position from said second position and being further adapted to arrest said two ends in a third position wherein said two ends are displaced relative to each other with respect to said first position thereby to effect snap-locking of said sleeve within said detent means.

2. The terminator mounting bracket assembly as recited in claim 1, wherein said detent means comprises a partly beveled, partly parallel extending passage and a rectangular-shaped aperture, said passage including two confronting surfaces which converge towards one another from an end of said bracket and then extend in a spaced parallel manner so as to interconnect with said rectangular-shaped aperture, said rectangular-shaped aperture having at least two spaced confronting side surfaces which extend in a same direction as said two confronting parallel extending surfaces belonging to said passage, said two confronting side surfaces of said rectangular-shaped aperture being spaced apart a greater distance than said two parallel extending confronting surfaces of said passage.

3. The terminator mounting bracket assembly as recited in claim 2, wherein said two confronting parallel extending surfaces of said passage maintain said two displaced confronting end portions of said sleeve when received therebetween in a greater state of compression than required for insertion thereof into said rectangular-shaped through aperture, said second position being established when said two confronting ends of said sleeve are inserted within said passage, said two confronting end portions of said sleeve when maintained in said greater state of compression being prepared for a rapid release therefrom by said insertion thereof into said rectangular-shaped aperture.

4. The terminator mounting bracket assembly as recited in claim 3, wherein said two confronting end portions of said sleeve are momentarily said released upon said insertion into said rectangular-shaped through aperture, said released two end portions of said sleeve said springing apart to abuttingly engage a different corresponding one of said two spaced side surfaces of said rectangular-shaped aperture, said side surfaces substantially enclosing said two end portions of said sleeve inserted therein about a line-like perimeter region thereof, said third position being established when said two confronting end portions of said sleeve are said enclosed.

5. The terminator mounting bracket assembly as recited in claim 4, wherein said snap-locked two end portions of said sleeve are removable from said rectangular-shaped aperture by said displacing said two end portions of said sleeve towards one another until said two end portions are enabled to be conveyed from said rectangular-shaped aperture and said passage without impediment from said side surfaces defining said rectangular-shaped aperture and said passage.

6. The terminator mounting bracket assembly as recited in claim 1, wherein said bracket comprises an elongated substantially flat metal member, said metal member being bent intermediate two end portions thereof, said bent metal member defining two segments, one segment being provided with said detent means, and the other being provided with at least one bolt-receiving aperture therein, said detent means comprising an elongated passage which starts at an edge of said bracket and runs into a through aperture, said passage having solely two confronting side surfaces, said through aperture having substantially surrounding side surfaces.

7. The terminator mounting bracket assembly as recited in claim 1, wherein said wall is of substantially uniform thickness and includes an internal surface and an external surface, substantially all of said other wall portion having a generally cylindrically-shaped configuration, said two confronting end portions projecting from said cylindrical configured wall portion in a spaced parallel manner such that first segments thereof have said internal surfaces which face each other, second segments thereof have said internal surfaces which face in identical directions, and third segments thereof have said internal surfaces which face each other.

8. The terminator mounting bracket assembly as recited in claim 7, wherein each one of said first segments extends straight out from said cylindrically-shaped wall portion in a manner to define a slit-like opening therein, each one of said second segments extending from a different one of said first segments and being bent substantially perpendicular therewith, and each one of said third segments extending from a different one of said second segments and being bent substantially perpendicular to said second segment.

9. The terminator mounting bracket assembly as recited in claim 8, wherein each confronting end portion is provided with at least one reinforcing sperical-shaped raised surface embossment, each one being positioned at a different region of said sleeve, said region being approximately located where each said first segment said extends from said cylindrically-shaped wall portion, and wherein each confronting end portion is provided with at least one reinforcing elongated ridge-shaped raised surface embossments, each said at least one ridge-shaped surface embossment being positioned at a different said internal surface of said second segments, said at least one spherical-shaped surface embossment and said at least one ridge-shaped surface embossment preventing said sleeve from becoming distorted in shape when subjected to load conditions encountered during said support of said terminator.

10. The terminator mounting bracket assembly as recited in claim 1, wherein said wall includes an internal surface and an external surface, said opening permitting said wall to be compressed by elastic contraction of said resilient material from a first boundary of a size suitable for inserting said sleeve unto a sleeve-receiving end of said terminator to a second boundary of a size suitable to establish a frictional gripping force between a substantial portion of said internal surface and an external surface defined by said sleeve-receiving end of said terminator when said two confronting ends are said displaced to said second and third positions.

11. The terminator mounting bracket assembly as recited in claim 10 wherein, said internal surface of said wall has at least one elongated anti-movement raised surface irregularity thereon, said anti-movement surface irregularity extending between said opposing edges, said anti-movement surface irregularity being imbedded in said external surface of said terminator when under said influence of said frictional gripping force.

* * * * *